United States Patent [19]
Yoshizumi

[11] Patent Number: 5,283,630
[45] Date of Patent: Feb. 1, 1994

[54] ERROR CORRECTING METHOD FOR MEASURING OBJECT SURFACE USING THREE-DIMENSION MEASURING APPARATUS

[75] Inventor: Keiichi Yoshizumi, Osaka, Japan

[73] Assignee: Matsushita Electric Industrial Co., Ltd., Osaka, Japan

[21] Appl. No.: 831,576

[22] Filed: Feb. 4, 1992

[30] Foreign Application Priority Data

Feb. 4, 1991 [JP] Japan .................. 3-13303

[51] Int. Cl.$^5$ .............................. G01B 11/04
[52] U.S. Cl. ...................... 356/376; 356/349; 356/360; 356/371; 33/502; 33/503; 33/505; 33/547
[58] Field of Search ............... 256/375, 376, 377, 243, 256/349, 360, 124, 371; 250/560, 561; 33/502, 503, 504, 505, 553, 554, 545–547

[56] References Cited

U.S. PATENT DOCUMENTS

| | | | |
|---|---|---|---|
| 4,682,894 | 7/1987 | Schmidt et al. | 356/243 |
| 4,697,927 | 10/1987 | Ono | 356/360 |
| 4,776,699 | 10/1988 | Yoshizumi | 356/349 |
| 4,886,362 | 12/1989 | Oono | 356/349 |
| 4,925,308 | 5/1990 | Stern et al. | 356/376 |
| 4,982,504 | 1/1991 | Soderberg et al. | 33/503 |
| 5,106,183 | 4/1992 | Yoder, Jr. | 356/376 |

FOREIGN PATENT DOCUMENTS

| | | |
|---|---|---|
| 59-79104 | 5/1984 | Japan . |
| 62-9211 | 1/1987 | Japan . |
| 2-254307 | 10/1990 | Japan . |

OTHER PUBLICATIONS

"Calibration Methods for Measurement Accuracy of the Ultrahigh Accurate 3-D Profilometer", Keiichi Yoshizume, Kadoma, Japan, pp. 687(57)–695(65).

"Ultrahigh Accuracy 3-D Profilometer", Keiichi Yoshizumi et al., Applied Optics, vol. 26, No. 9, May 1, 1987, pp. 1647–1653.

Primary Examiner—Richard A. Rosenberger
Assistant Examiner—Hoa Q. Pham
Attorney, Agent, or Firm—Wenderoth, Lind & Ponack

[57] ABSTRACT

A three-dimension measuring apparatus having a probe, such as non-contact optical probe, is used to measure the surface of an object, such as an aspherical lens. Initially, the apparatus is used to obtain reference probe measured values of a reference spherical surface having a concave surface and a convex surface. The thus obtained reference probe measure values are compared with data denoting an ideal spherical surface to determine measurement errors corresponding to inclinations of the surface of an object to be measured. Then, the apparatus is used to measure the object to obtain respective probe measured values. The previously determined measurement errors are subtracted from the measured values of corresponding inclinations, thereby compensating for the measurement errors during measurement of the object surface.

12 Claims, 9 Drawing Sheets

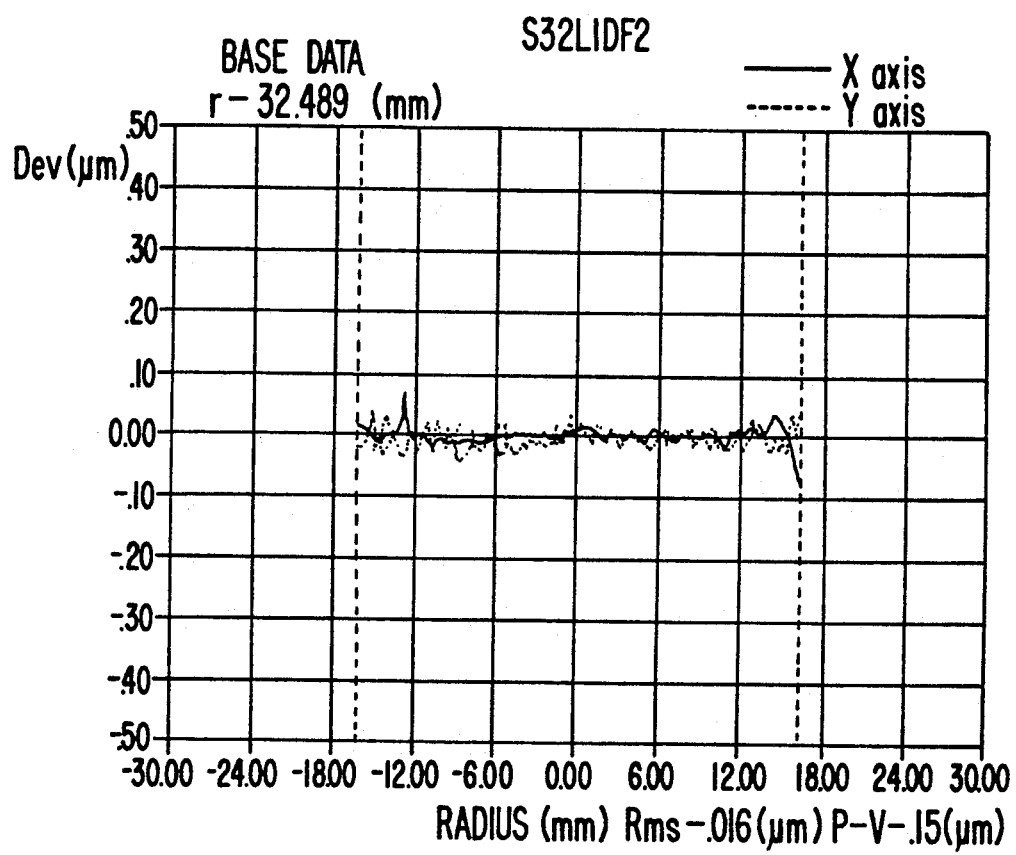

ERROR CORRECTING METHOD FOR MEASURING OBJECT SURFACE USING THREE-DIMENSION MEASURING APPARATUS

BACKGROUND OF THE INVENTION

The present invention relates to an error compensating method of using a three-dimensional measuring apparatus to measure a free-curved surface such as an aspherical lens at a high accuracy of 0.1 to 0.01 μm.

In recent years, a measurement of approximately submicron to 10 nm accuracy is required in measuring the configuration of a free curved object such as an aspherical lens. a conventional contact-type three-dimension measuring apparatus or an interferometer is incapable of measuring an object with such an accuracy. In order to solve this problem, Japanese Laid-Open Patent Publications No. 59-79104 and No. 62-9211 disclose three-dimension measuring apparatuses, respectively capable of measuring an aspherical surface and a free curved surface with a high accuracy. These measuring apparatuses condense light on an object surface to be measured so as to measure the configuration of the object surface using an optical probe.

The three fundamental elements (errors) relating to the degree of accuracy of the three-dimension measuring apparatus are scale, probe, and coordinate axes.

Of these three elements, scale is graduated on three coordinates and can be calibrated according to the length standard determined by the Weight and Measure Act. Therefore, the element of scale is not further described below.

The calibration of the probe error (i.e. an error resulting from an inclination of an object surface to be measured) is made by utilizing one kind of reference sphere in which the roundness and diameter are accurately confirmed, and the calibration of the coordinate axes (i.e. the squareness of each coordinate) is calibrated by utilizing a four-right angle master.

However, the conventional calibration method nevertheless includes a probe error and the error caused by the inaccurate squarenesses of coordinates. These errors are mixed in measured data without being separated from the measured data, which prevents the object from being measured with a high accuracy, and in addition, even though a reference sphere is measured, a perfect calibration of the measurement made by the measuring apparatus cannot be accomplished.

The accuracy of the four-right angle master is limited to approximately one second. Therefore, the four-right angle master is not sufficient to calibrate the squareness of the ultra-high accurate three-dimension measuring apparatus. Also, since the right angle master calibrates the squareness of the three-dimension measuring apparatus in an indirect method, it is difficult for a user to easily calibrate the squareness.

In order to solve the above-described problem, the inventors have measured a reference spherical surface of convex and concave surfaces of the same radius of curvature, and based on the measured data it has been found that an error caused by an inaccurate squareness of coordinates and a probe error depending only on the inclination of an object surface can be separated from each other, and both errors can thus be quantitatively detected respectively.

SUMMARY OF THE INVENTION

Accordingly, an essential object of the present invention is to provide a method for correcting the measurement error of a three-dimension measuring apparatus, so that the apparatus is capable of measuring an object surface with a higher accuracy, by first examining the accuracy of a three-dimension measuring apparatus, calculating the errors, and then removing the errors from measured data of the configuration of a surface to be measured.

In accomplishing these and other objects, there is provided a method for measuring the surface of an object such as an aspherical lens using a three-dimension measuring apparatus having a probe such as a non-contact optical probe. The method includes: a first step of calculating measurement errors respectively corresponding to inclinations of said surface of said object to be measured based on prestored measured data of a reference spherical surface; a second step of placing said object at an object measuring location of said three-dimension measuring apparatus; a third step of positioning said probe at a plurality of points located on a said surface of said object and obtaining corresponding respective probe measured values; a fourth step of determining respective measured inclinations at said plurality of points located on said surface of said object based on said probe measured values; a fifth step of subtracting respective measurement errors calculated in said first step from said respective probe measured values obtained in said third step to obtain corrected measurement values representative of said surface of said object, wherein each subtracted measurement error corresponds to an inclination determined in said fourth step of a corresponding probe measured value.

The reference spherical surface includes a concave surface and a convex surface, and said first step includes placing said reference spherical surface at said object measuring location of said three-dimension measuring apparatus, positioning said probe at points located on said concave and convex surfaces to obtain reference probe measured values and comparing said reference probe measured values with data denoting an ideal spherical surface to determine said measurement errors.

BRIEF DESCRIPTION OF THE DRAWINGS

These and other objects and features of the present invention will become clear from the following description taken in conjunction with the preferred embodiments thereof with reference to the accompanying drawings, in which:

FIG. 9 is a diagram of the calibrated measured data for a concave sphere master lens.

DETAILED DESCRIPTION OF THE INVENTION

Figure 1:
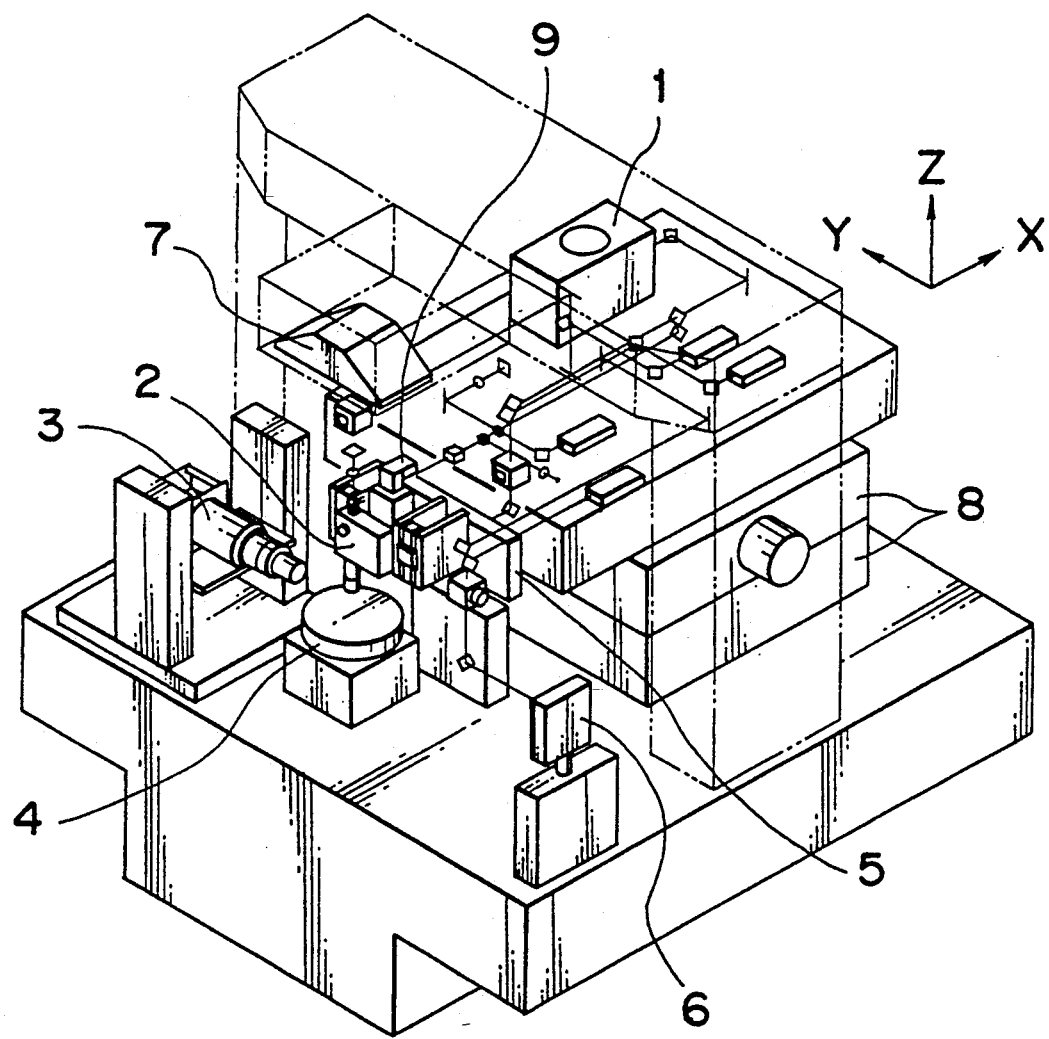
FIG. 1 is a perspective view of the construction of a wide-aperture type and an Ultra-high Accurate Profilometer used in carrying out an error correcting method according to an embodiment of the present invention.

Before the description of the present invention proceeds, it is to be noted that like parts are designated by like reference numerals throughout the accompanying drawings.

An embodiment of the present invention will be described below with reference to the accompanying drawings.

Table 1 lists each item of a measuring system that is to be calibrated, in terms of a three-dimensional rectangular coordinate system, in a measuring apparatus according to the embodiment. FIG. 1 is a schematic diagram of a wide-aperture type of Ultra-high Accurate Profilometer.

TABLE 1

| Error Items | Items To Be Calibrated Error Factors |
|---|---|
| (1) Axes (XYZ-axes) | (1) Squareness between X, Y, and Z-axes (2) Straightness of X, Y, and Z-axes |
| (2) Scale | (3) Accuracy of the wavelength of the stabilized laser |
| (3) Sensor (Optical probe) | (4) Dependence on the inclination of the measured surface (5) Dependence on the reflectivity of the measured surface |

The errors associated with the coordinate axes include the squareness between the coordinate axes and the straightness of each coordinate axis. As shown in FIG. 1, the apparatus has an x-axis planar mirror 5, a y-axis planar mirror 6, and a z-axis planar mirror 7. These mirrors 5, 6, and 7 serve as reference planes. Therefore, the accuracies of the coordinate axes are determined by the straightness of each mirror 5, 6, and 7 and the squareness between the mirrors 5, 6, and 7. Reference number 1 denotes a Zeeman laser, 2 an optical probe, 3 a spindle for polar measurement, and 4 an object to be measured. An error due to the pitching and yawing of xy-movable stages 8 and a z-movable stage 9 is not larger than 10 nm because a coordinate is measured by utilizing the interference of the reference planes with the stages 8 and 9.

Since the scale is the wavelength of a stabilized laser beam, only the error of the wavelength is calibrated.

The sensor of the apparatus consists of a non-contact type optical probe 2 having a low power of 0.5 mW. Therefore, contact pressure does not cause an error to occur. Since a surface of an object is measured by using light reflected from the surface, an error associated with the probe occurs only due to the inclination and inconsistency in the reflectivity of the object surface which affect the intensity and distribution of the reflected light assuming that the object surface is smooth at the spot thereon where the measuring light is incident.

Even the contact portion of a contact type probe is spherical and thus the probe contacts the object surface at different locations thereon depending on the inclination of the object surface. Therefore, a probe error is dependent on the inclination of the object surface. The calibration method of the present invention can be effectively used even in this case. However, since an error can arise due to contact pressure, the contact type probe is not capable of measuring the object surface as accurately as the non-contact type optical probe.

Of the items listed in Table 1, the error in the squareness between the XYZ-axes and the optical probe error associated with the inclination of the object surface are mixed in data obtained by conducting a measurement of the object surface. Thus, it is difficult to separate these errors and calibrate for these errors accordingly. The present inventors have found a way to separate these errors from the data and calibrate for them. Other errors can be independently calibrated as will be described later.

Calibration of Optical Probe Error and Squareness Error Between Axes

An error in the measurement of an inclined curved surface having a constant reflectivity, which error is dependent only on the inclination of the object surface and has a one-to-one correspondence with the inclination, will be referred to as an optical probe error because the error can be discriminated based on the optical property of the optical probe.

However, squareness errors are mixed in measured data because when such errors occur the x-axis, y-axis, and z-axis are not at right angles to each other. The method for separating these squareness errors out and calibrating for the squareness errors will be described below.

Reference spherical convex and concave surfaces having an equal radius of curvature are measured. Let it be supposed that the measurement errors of these surfaces have been corrected with a high degree of accuracy. The method for correcting the measurement errors of the reference spherical surfaces will be described below.

The measured results are compared with the equation of an ideal spherical surface so as to obtain an error zd. The error zd is the sum of a squareness error Ea of a coordinate axis expressed by unknown letters and an optical probe error Ep. That is, If the reference spherical surface is convex, the error zd is as follows:

$$zd\ (convex) = EA\ (convex) + Ep\ (convex) \quad (1)$$

If the reference spherical surface is concave, the error zd is as follows:

$$zd\ (concave) = Ea\ (concave) + Ep\ (concave) \quad (2)$$

Detection and Calibration of Squareness Error

First, the squareness error Ea is calculated. Based on the measurement of the ideal spherical surface made by a measuring apparatus having a squareness error between its x-axis and z-axis and no optical probe error, the squareness error C (rad) between the x-axis and the z-axis is calculated.

The concave and convex spherical surfaces having equal radii of curvature R (>0) are expressed by the following equation:

$$z = \pm\{-R + (R + (R^2 - x^2 - y^2)^{\frac{1}{2}}\}$$

When the spherical surface is convex and only the x-axis direction is considered, $$z = -R + (R^2 - x^2)^{\frac{1}{2}} \tag{3}$$

Figure 2:
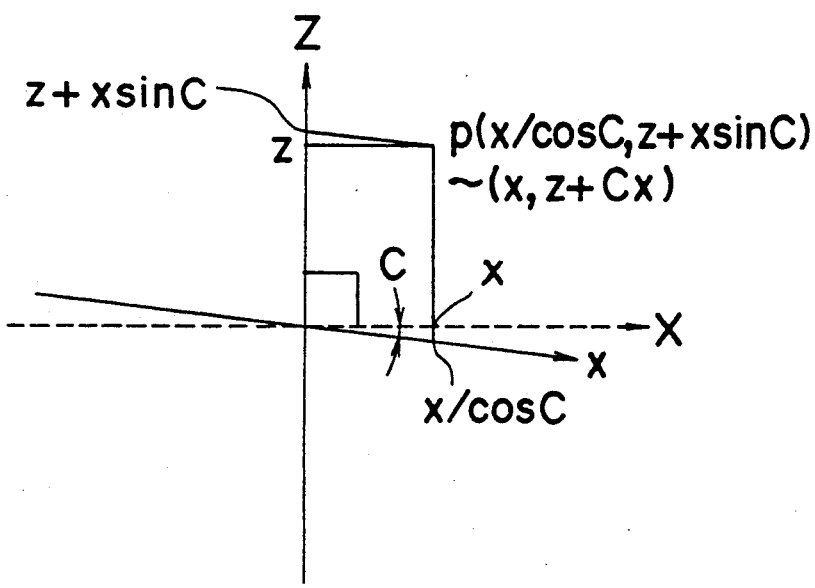
FIG. 2 is a graph showing that when the angle between x and z axes inclines by C from the right angle axis x, the coordinate of the point p(X, z) becomes $\sim$(x, z+Cx)

As shown in FIG. 2, an axis inclined by -C with respect to an X-axis perpendicular to the Z-axis will be denoted the x-axis. As shown in FIG. 2, a point (p) expressed by (x, z) in a coordinate system having no squareness errors can be expressed by (x/cosC, z+xsinC) in an inclined coordinate system. Since the value of C is approximately a second, sinC is approximated as C and cosC is approximated as 1. The point (p) can thus also be expressed by (x, z+Cx) in the inclined coordinate system. Thus, measured data is expressed as follows:

$$z = -R(R^2 - x^2)^{\frac{1}{2}} + Cx$$

However, in the above equation, the position of x=0 is not the top point of the convex surface. The value of C is unknown at this time. The measuring apparatus searches for the top point automatically, and sets the top point as the origin of the coordinate system. More specifically, the apparatus has a function of calculating the top point based on the coordinates of two points in the vicinity of the top point and the given radius of curvature R and positions the optical probe at the top point. This operation is known as a centering function and is disclosed in Japanese Laid-Open Patent Publication No. 2-254307. If the origin is displaced by (t,p) from the real origin of the coordinate system, measured data is expressed by the following equation (4):

$$z = -R + \{R^2 - (x - t)^2\}^{\frac{1}{2}} + p + Cx \tag{4}$$

The error zd obtained by subtracting equation (3) representing the reference spherical surface from equation (5) of the measured data is approximated as follows if a point x and a point x-t positioned in the vicinity of the top point of the spherical surface are much smaller than the radius of curvature R:

$$\{R^2 + (x - t)^2\}^{\frac{1}{2}} \sim -R + (x - t)^2/2Rzd \sim \tag{5}$$

$$\{x^2 - (x - t)^2\}/2R + p + Cx = (t/R + C)x - t^2/2R + p$$

The centering function sets the origin so that the value of x is zd in the vicinity of zero and the inclination of the measurement error zd is zero. Thus, the following equation is obtained.

$$t = -CR$$

$$p = t^2/2R = C^2R/2 \tag{6}$$

The measured data z is obtained by substituting the equations (5) and (6) into the equation (3).

$$z = -R + \{R^2 - (x + CR)^2\}^{\frac{1}{2}} + C^2R/2 + Cx \tag{7}$$

Similarly, when the spherical surface is concave, the measured value of z is obtained from the following equation (8):

$$z = R - \{R^2 - (x - CR)^2\}^{\frac{1}{2}} - C^2R/2 + Cx \tag{8}$$

Figure 3:
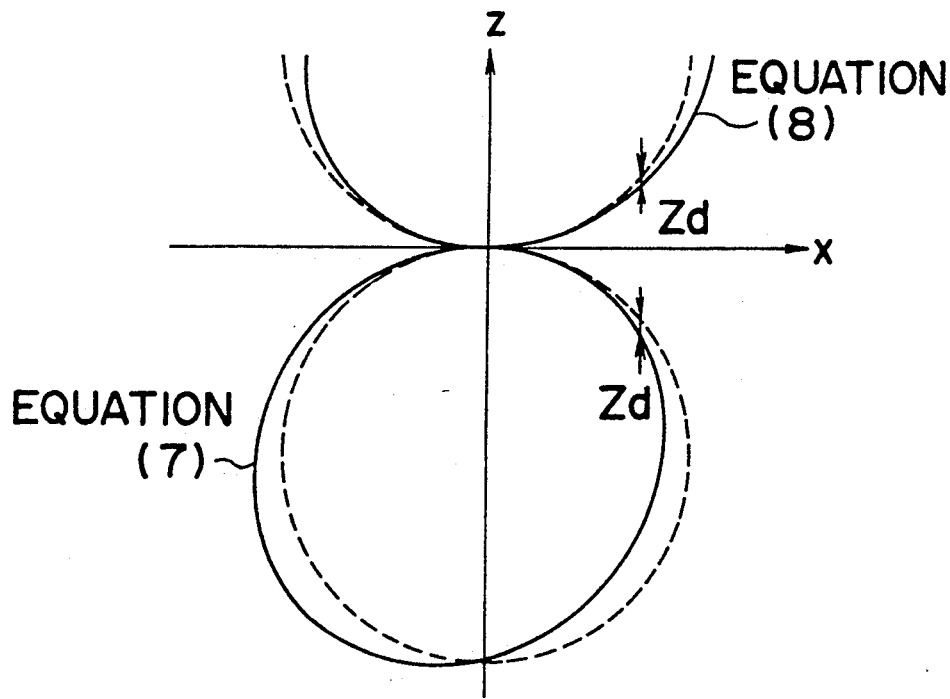
FIG. 3 is a plotted diagram expressed by the equations (7) and (8)

FIG. 3 shows a plotted diagram expressed by the equations (7) and (8) supposing that the value of C is as great as 7°. Solid lines show a diagram when C=7°, and broken lines show an ideal circle when C=0°. The difference zd between the ideal circle shown by the broken lines and the diagram shown by the solid lines is of the same polarity at the convex and concave surfaces. Thus, when C is small, it can be assumed that the concave and convex surfaces have the same error zd.

In order to confirm this assumption, the error zd is calculated by subtracting the equation representing the spherical surface from the equations (7) and (8):

When the reference spherical surface is convex, $$zd = \{R^2 - (x + CR)^2\}^{\frac{1}{2}} - (R^2 - x^2)^{\frac{1}{2}} + C^2R/2 + Cx \tag{9}$$

When the reference spherical surface is concave, $$zd = (R^2 - x^2)^{\frac{1}{2}} - \{R^2 - (x - CR)^2\}^{\frac{1}{2}} - C^2R/2 + Cx \tag{10}$$

An error in measuring convex and concave surfaces having equal radii of curvature R=32 mm is calculated in an area of ±25 mm passing through the middle point in the x-direction by a measuring apparatus having a squareness error $C = 4.8 \times 10^{-6}$ (=one second) by using the equations (9) and (10). The diagrams expressed the equations (9) and (10) coincide with each other as plotted in FIG. 4. Since this configuration is S-shaped, the error is denoted an S-letter error.

As is apparent from the above, the squareness error Ea of the concave and convex surfaces of the same radius of curvature have the same polarity and the same configuration. Thus, the equations (1) and (2) can be expressed as follows:

Ea (convex) = Ea (concave) = Ea

The optical probe error depends only on the inclination of the object surface as described below.

Figure 5:
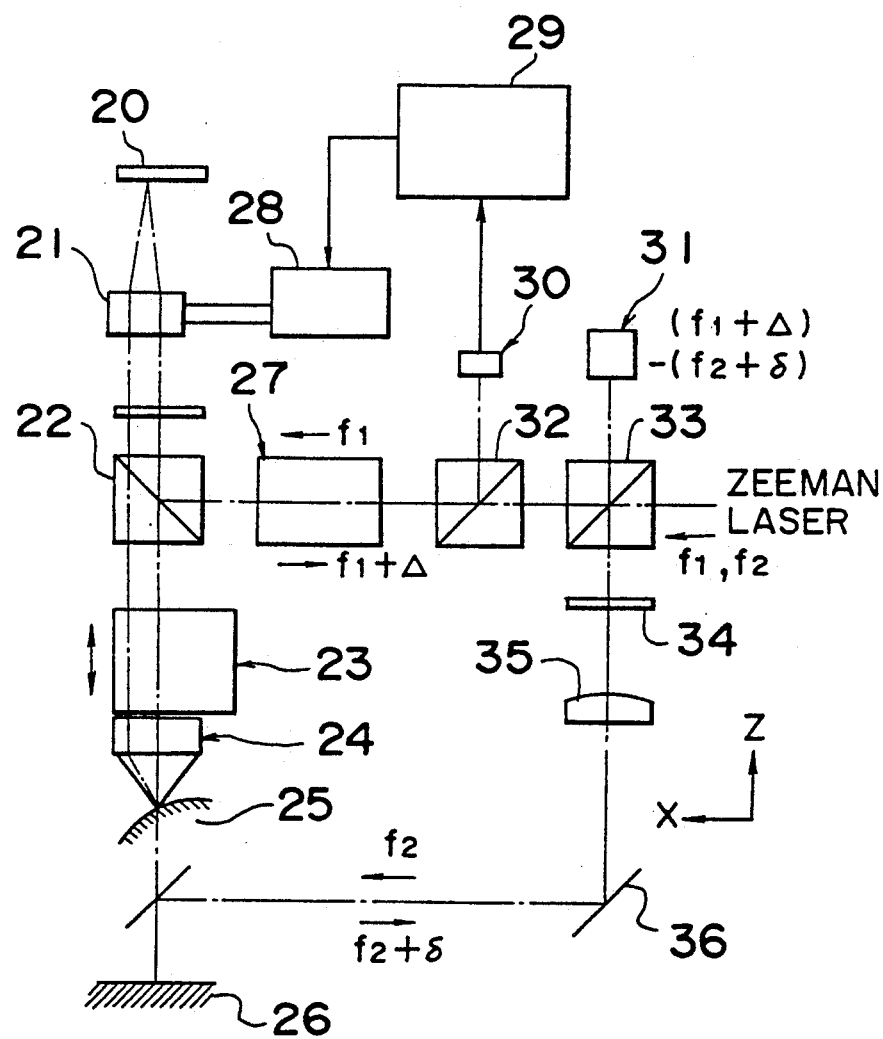
FIG. 5 is a view of the schematic construction of Z-axis measuring optics.

The optical probe having a construction as shown in FIG. 5 condenses semiconductor laser beams in a circle of 1 μm diameter on the object surface and applies focus servo based on the distribution of reflected laser beams so as to move a z-stage. A method of reading a z-coordinate based on the position of the z-stage is called an "indirect measurement". In FIG. 5, a reference numeral 20 denotes a mirror, 21 a lens, 22 a PBS, 23 a Diode laser focus servo optics, 24 an objective lens, 25 a surface to be measured, 26 a reference mirror, 27 a Farady rotator, 28 motors, 29 an incline servo unit, 30 a 4-split photo sensor, 31 a photo sensor, 32 and 33 a PBS, 34 a λ/4 plate, 35 a lens, and 36 a mirror. Lights from the Zeeman laser and the Diode laser are focused on the same point of the measured object. The measured object and the reference mirror are fixed during the X-Y-Z measurement. The other element move simultaneously.

The following direct method, which is called "direct measurement", is utilized to measure a z-coordinate. He-Ne Zeeman laser beams are directly condensed on a circle of 2 μm diameter of an object surface so that a focus error does not affect the measurement error and reflected laser beams are interfered with light reflected by reference mirrors so as to measure the z-coordinate. The optical probe includes an inclination correcting optical system to allow He-Ne Zeeman laser beams to be perpendicularly incident on the object surface even though the object surface has an inclination.

Owing to the use of the non-contact type optical probe, no contact pressure is generated, which minimizes the dispersion of measured values. In addition, even though the object surface has an inclination, the focus error is minimized and the optical path lengths are hardly differentiated from each other. However, it is necessary to consider the accuracy of optical parts used, the assembly accuracy thereof, and the optical probe error due to the inclination of the object surface in consideration of the fact that the optical path length significantly changes if the object surface has an inclination in the range of ±30°.

When the object surface is smooth and has a constant reflectivity, the object surface can be approximated to a plane having an inclination when a measuring range is limited to a spot of an area as small as 1 to 2 μm. At this time, the optical path and distribution of light reflected by the object surface depend only on the inclination of the plane and correspond to the inclination in a one-to-one relation.

It is possible to compose an optical probe error EP of an error Ep1 depending only on the absolute value of the inclination of the object surface and an error Ep2 which is inverted by the direction of the inclination thereof. The reason for this is that the optical probe error Ep in the measurement of the concave and convex surfaces of the same radius of curvature is expressed by the following equation, and two unknown letters Ep(convex) and Ep(concave) can be expressed by the two unknown letters Ep1 and Ep2, respectively.

$$Ep\ (convex) = Ep1 + Ep2$$

$$Ep\ (concave) = Ep1 - Ep2$$

Accordingly, the measurement error zd of the spherical surface is as follows:

$$zd\ (convex) = Ea + Ep1 + Ep2$$

$$zd\ (concave) = Ea + Ep1 - Ep2$$

Therefore, $$Ea + Ep1 = (zd(convex) + zd(concave))/2 \quad (11)$$

$$Ep2 = (zd(convex) - zd(concave))/2 \quad (12)$$

Figure 4:
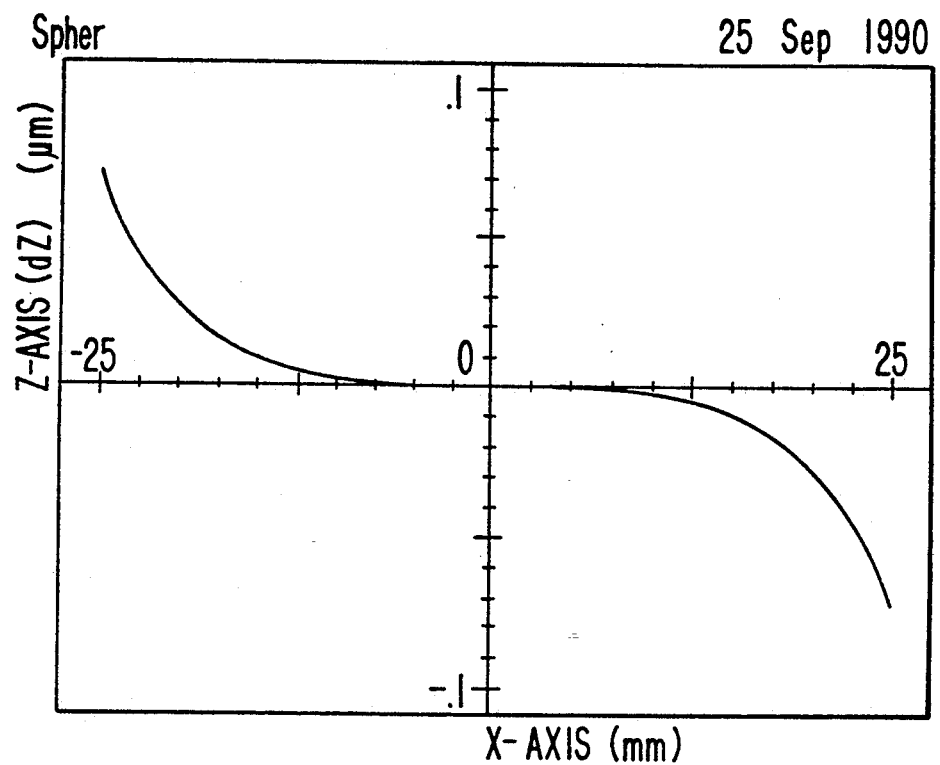
FIG. 4 is a plotted diagram expressed by the equations (9) and (10)

Ea of the equation (11) is an S-letter error and is expressed by the equations (9) and (10). As shown in FIG. 4, the polarity of the (+) direction is opposite to that of the (−) direction. The squareness error Ea can be found by selecting a squareness error C(rad) between the x-axis and z-axis and a squareness error D(rad) between the y-axis and z-axis so that the configuration of an object expressed by an equation resulting from the subtraction of the equation (9) or (10) from the equation (11) is literally symmetrical. The error Ep1 can be found from the equation (11).

Figure 6:
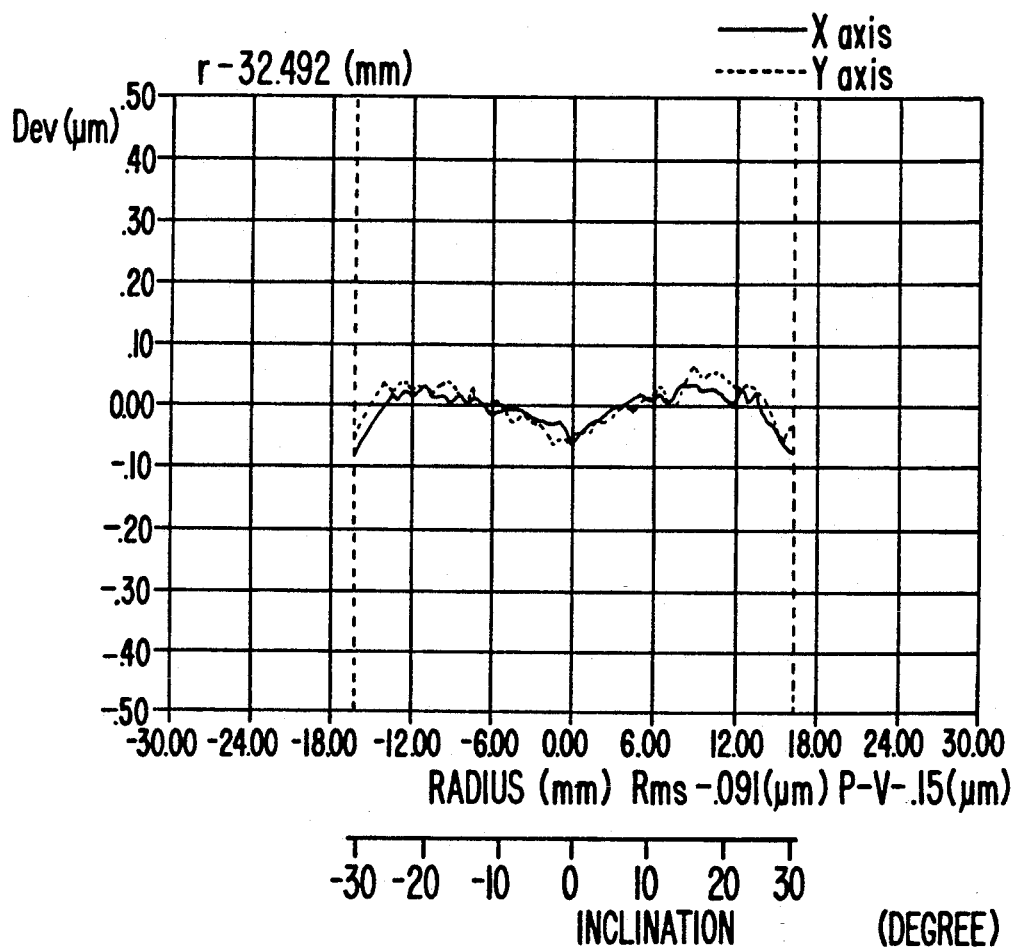
FIG. 6 is a diagram showing an example of the element $Ep1$ of the optical probe error, caused by the absolute value of the inclination of the measured surface.
Figure 7:
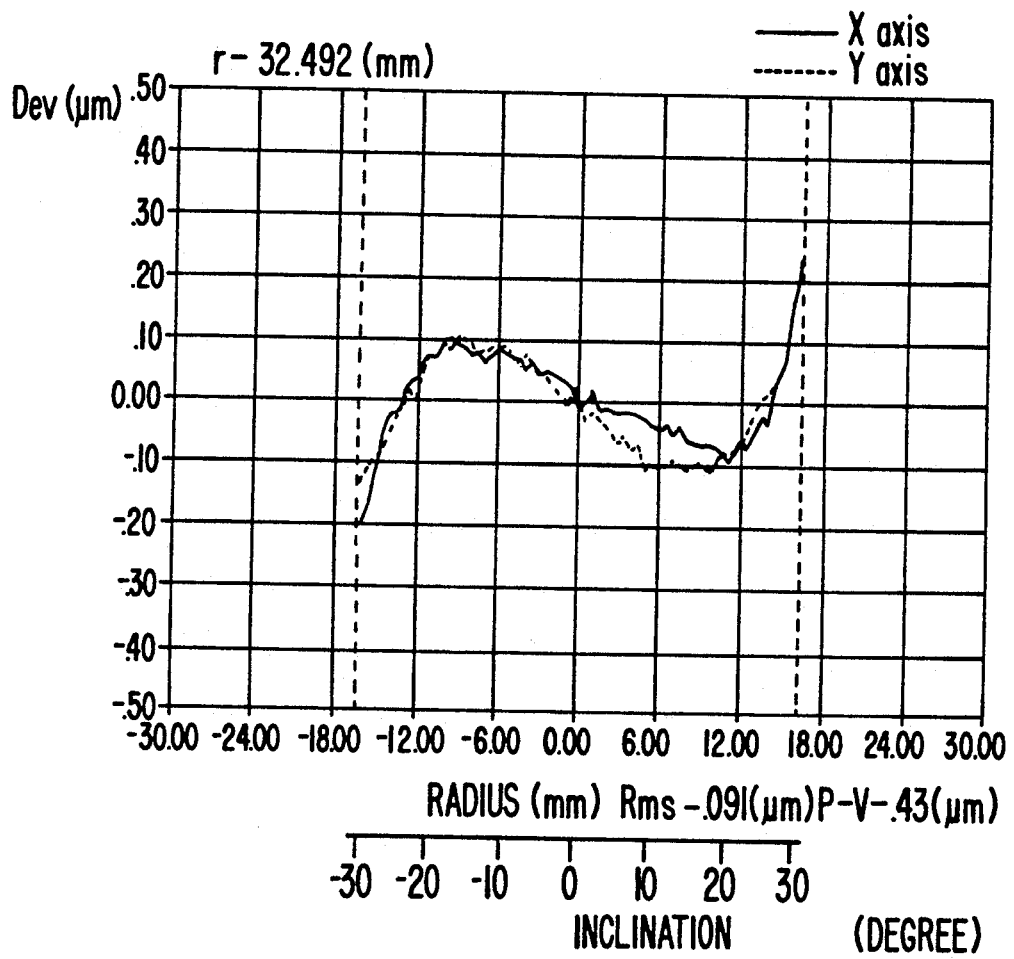
FIG. 7 is a diagram showing an example of the element Ep2 of the optical probe error, which depends on the direction of the inclination of the measured surface and turns over for positive and negative directions of the inclination of the measured surface.

An example of each of the errors Ep1 and Ep2 found from the measured values is shown in FIGS. 6 and 7, respectively. As described above, in measuring the concave and convex spherical surfaces of the equal radius of curvature, the squareness error and the optical probe error can be detected separately from the measurement data.

The squareness error is corrected by adding Cx+Dy to the measured value of a z-coordinate.

If, for example, the squareness error is one second, an error (S-letter error) resulting from the measurement of an area of ±90 mm about the center of a spherical surface having a radius of curvature of R=180 mm is 60 nm. Therefore, it is necessary that the squareness between coordinate axes is not more than 0.5 seconds in order to secure that the measurement accuracy is not more than 50 nm. The method of the present embodiment is capable of calibrating an error to this extent. Since the stroke of the z-stage is as short as 24 mm, the method utilizing a four-right angle master is incapable of carrying out a calibration with such an accuracy. The above description is concerned with the squareness error between xy-axes and z-axis which may become a problem in measuring an object surface such as an aspherical lens.

The calibration of the squareness between the x-axis and y-axis can be performed with an accuracy of approximately one second by the four-right angle master, because the stroke of the xy-stage is great. The accuracy of approximately one second is sufficient for measuring the configuration of an object surface such as an aspherical lens.

Detection and Correction of Optical Probe Error

As described above, Ea=0 is obtained by correcting the squareness error. Therefore, the optical probe errors Ep1 and Ep2 can be found by the equations (11) and (12) based on the measured values of the reference spherical surface.

The errors of the equations (11) and (12) result in correspondence with the xy-coordinates. The errors are made to be correspondent with the inclination of the object surface. A description is made in only the x-direction. The inclination 0 at a coordinate (x, 0) of a sphere having a radius of R is expressed as follows:

$$0 = sin^{-1}(x/R)$$

As shown in graduations positioned in the lower portion of the graphs of FIGS. 6 and 7, the optical probe errors Ep1 and Ep2 can be made to be correspondent with the inclination of the object surface. This data is stored by a computer as the reference data for calibration.

Figure 8A:
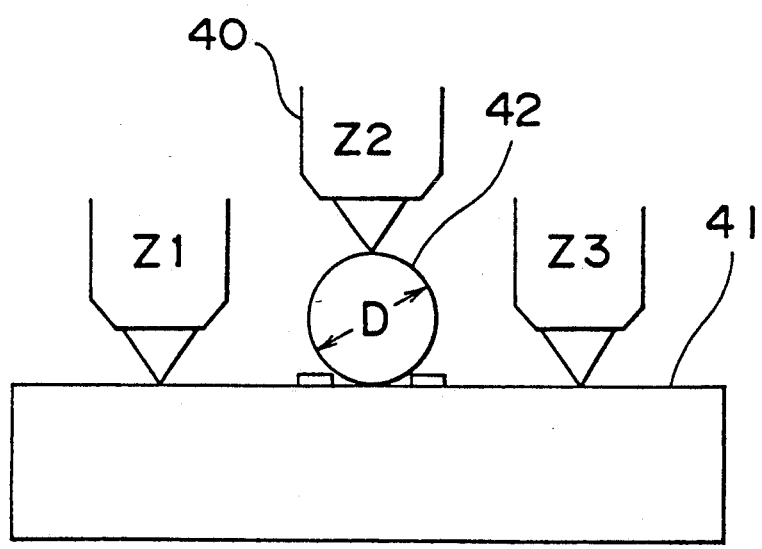
FIG. 8A is a schematic view of an apparatus for measurement of a diameter of a reference sphere by using the UA3P.
Figure 8B:
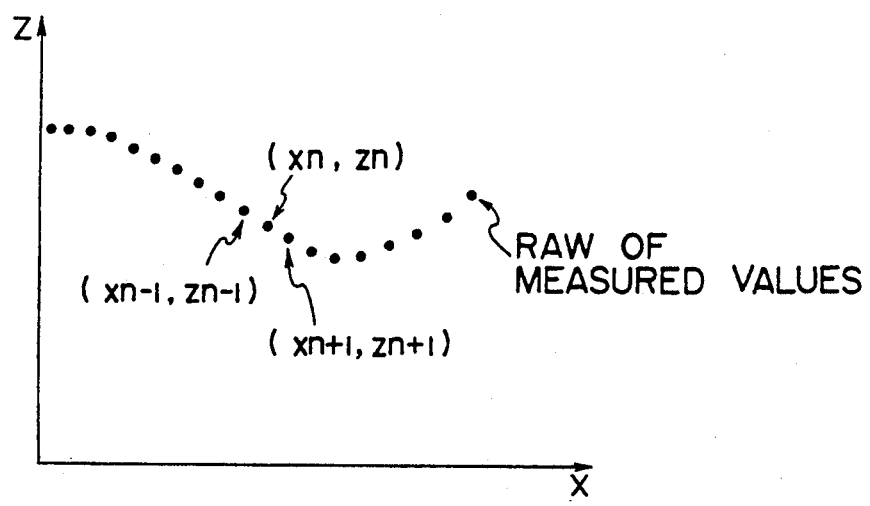
FIG. 8B is a diagram showing an inclination calculation.

In measuring the spherical surface, as shown in FIG. 8B, the inclination of the spherical surface at each measuring point is calculated based on a raw of measured values, and when an x and z planes are considered for simplification, the following equation is obtained supposing that the inclination of the surface at the measured point $(x_n, z_n)$ is $h_n$;

$$h_n = \frac{(z_{x+1} - z_{n-1})}{(x_{n+1} - x_{n-1})}$$

Then, the reference data for calibration corresponding to each inclination and stored in the computer is subtracted from each calculated inclination of the spherical surface. Thus, the optical probe errors Ep1 and Ep2 can be made to be zero.

Calibration of Reference Spherical Surface

It is necessary to calibrate the accuracy of the reference spherical surface and the radius of curvature thereof. The accuracy of the spherical surface can be calibrated by the calibrated apparatus of the embodiment, a commercially available roundness measuring apparatus, or a commercially available interferometer. The spherical surface can be measured at an accuracy of 10 nm by a certain roundness measuring apparatus. The interferometer measures the spherical surface at an accuracy of approximately λ/10, namely, 63 nm, i.e., the reference planes thereof are capable of measuring the spherical surface at this accuracy. The repeatable accuracy of the interferometer is not more than 6 nm. Therefore, a calibration can be made at an accuracy of approximately 20 nm by rotating the spherical surface so as to change the measuring position. This is because if the same error is made even though the measuring position of the spherical surface is changed, the error is considered as the error of the reference plane of the interferometer, and then the error is subtracted from a measured value.

The radius of curvature of the reference spherical surface is calibrated at the highest accuracy of approximately 10 nm by the apparatus of the embodiment which carries out the method shown in FIG. 8A. A reference sphere 42 of approximately 10 mm in diameter is placed on a highly accurate flat mirror 41 and the position of the top of the sphere 42 is measured by an optical probe 40 so as to obtain the difference between the measured value of the top point of the sphere 42 in the z-coordinate and the mirror surface in the z-coordinate. The difference is the diameter of the sphere 42.

The absolute value of the radius of curvature is calibrated by further correcting only the component of the radius of curvature of the optical probe error Ep1.

FIG. 9 shows the measurement error, of the reference spherical surface, obtained by calibrating the absolute value of the radius of curvature, the optical probe error, and the squareness error.

Example of Measurement of Aspherical Surface

Figure 10A:
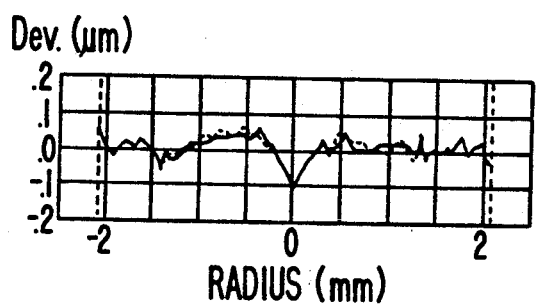
FIGS. 10(a)–10(d) show results of the configuration measurement of a mold of each surface of an aspheric mold and the transmission wave face aberration of a lens.
Figure 10B:
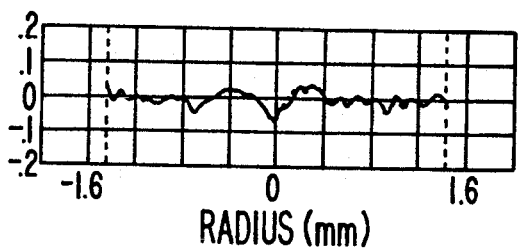
Figure 10C:
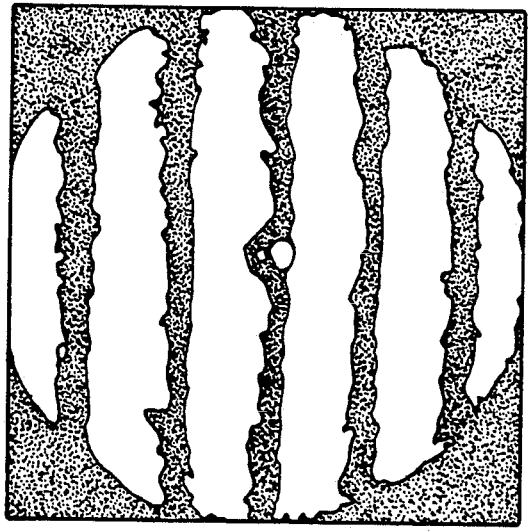
Figure 10D:
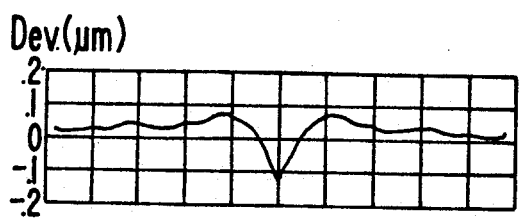

The measurement accuracy of the configuration of an aspherical surface can be confirmed by the coincidence of transmission wave surface aberration with the sum of the error resulting from the measured value of each plane of an aspherical lens. FIG. 10 shows a result of the configuration measurement of a mold for each surface of a glass lens, for use in an optical disk, both surfaces of which are aspherical. The measurement is made by the apparatus of the embodiment. FIG. 10 also shows the transmission wave face aberration of the lens pressed by the mold and the configuration errors of both of the first surface and a second surface calculated from the transmission wave face aberration. In particular, FIG. 10(a) shows the first surface of the mold. FIG. 10(b) shows the second surface of the mold. FIG. 10(c) shows an interferogram of the bi-aspheric lens. FIG. 10(d) shows the cross-section of the interferogram. It is understood that the configuration of both of the first surface and the second surface coincides with the transmission wave face aberration. The configuration error of this lens results from the following designed equation of an aspherical surface.

$$z = f(x) = (x^2/R)/\{1 + (1 - Ax^2/R^2)^{\frac{1}{2}}\} + \sum_{k=1}^{20} a_k |x|^k$$

where x, y, z denote rectangular coordinates; $r=(x^2+y^2)^{\frac{1}{2}}$ is substituted into the above equation instead of x in the case of rotation symmetry; R denotes a paraxial radius of curvature; A denotes a 1+conic coefficient; $a_k$ denotes an aspherical coefficient of degree k.

The method of the embodiment having the above-described construction and operation is capable of calibrating errors measured by a three-dimension measuring apparatus much more accurately and easily than the conventional apparatuses. That is, by the present method, the probe error can be separately detected from the squareness error of a coordinate by only measuring reference convex and concave spherical surfaces, and then measurement errors can be corrected. The method allows a user to calibrate errors resulting from the use of three-dimension measuring apparatuses easily and completely. Thus, the present method can contribute to industry and scientific developments.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of measuring the surface of an object using a three-dimension measuring apparatus having an probe, said method comprising:
   a first step of calculating measurement errors respectively corresponding to inclinations of said surface of said object to be measured based on prestored measured data of a reference spherical surface;
   a second step of placing said object at an object measuring location of said three-dimension measuring apparatus;
   a third step of positioning said probe at a plurality of points located on a said surface of said object and obtaining corresponding respective probe measured values;
   a fourth step of determining respective measured inclinations at said plurality of points located on said surface of said object based on said probe measured values;
   a fifth step of subtracting respective measurement errors calculated in said first step from said respective probe measured values obtained in said third step to obtain corrected measurement values representative of said surface of said object, wherein each subtracted measurement error corresponds to an inclination determination in said fourth step of a corresponding probe measured value.

2. A method as claimed in claim 1, wherein said reference spherical surface includes a concave spherical surface and a convex spherical surface, and wherein said first step includes placing said reference spherical surface at said object measuring location of said three-dimension measuring apparatus, positioning said probe at points located on said concave and convex spherical surfaces to obtain reference probe measured values and comparing said reference probe measured values with data denoting an ideal spherical surface to determine said measurement errors.

3. A method as recited in claim 2, wherein said object is an aspherical lens.

4. A method as recited in claim 2, wherein said probe is a non-contact optical probe.

5. A method as recited in claim 4, wherein said concave spherical surface and said convex spherical surface have a same radius of curvature.

6. A method as recited in claim 3, wherein said concave spherical surface and said convex spherical surface have a same radius of curvature.

7. A method as recited in claim 2, wherein said probe is a non-contact optical probe.

8. A method as recited in claim 7, wherein said concave spherical surface and said convex spherical surface have a same radius of curvature.

9. A method as recited in claim 2, wherein said concave spherical surface and said convex spherical surface have a same radius of curvature.

10. A method as recited in claim 1, wherein said object is an aspherical lens.

11. A method as recited in claim 1, wherein said probe is a non-contact optical probe.

12. A method as recited in claim 10, wherein said probe is a non-contact optical probe.

* * * * *